United States Patent Office 3,128,309
Patented Apr. 7, 1964

3,128,309
β-METHALLYL-β-PHENETHYLAMINE
Burton K. Wasson, Valois, Quebec, and John M. Parker, Montreal, Quebec, Canada, assignors to Charles E. Frosst & Co., Montreal, Quebec, Canada, a corporation of the province of Quebec
No Drawing. Filed Feb. 12, 1962, Ser. No. 172,759
3 Claims. (Cl. 260—570.8)

The present invention relates to β-methallyl-β-phenethylamine and the non-toxic acid addition salts thereof.

The products of the present invention are valuable therapeutic drugs which have been found useful as sympathomimetic agents.

The new and useful compounds of this invention may be prepared by reducing α-methallyl-α-phenyl acetonitrile with lithium aluminum hydride. The reduction may be carried out in the presence of an organic solvent such as ethyl ether and takes place smoothly at the reflux temperature of the reaction mixture, with the formation of an organo-metallic complex. The complex is then decomposed by the cautious addition of water and extracted with ethyl ether. The combined ethereal extracts may then be extracted with a suitable mineral acid, such as dilute hydrochloric acid to separate the amine from any of the unchanged nitrile. The free base may then be isolated by making the aqueous acid extract basic, and isolated in any conventional manner.

The acid addition salts of the above product may be readily prepared by dissolving the free amine in a suitable acid and isolating the acid addition salt by crystallization or by other suitable means.

As suitable acid addition salts there may be mentioned those derived from mineral acids such as hydrochloric acid, hydrobromic acid, hydriodic acid, phosphoric acid, and sulfuric acid, as well as organic acids such as acetic, citric, tartaric, benzoic, salicylic, glycolic, succinic, nicotinic, ascorbic, maleic, malic or lactic acids, and the like.

The lethal dose of the compounds in mice was determined as follows: Intraperitoneal injections of the compounds in a gum acacia suspension were given to groups of mice using five animals to a group. The animals were observed for five days and the number of deaths recorded. The percent mortality was plotted against logarithm of the dose and the $LD_{50}$ value determined by the method of Litchfield and Wilcoxon (J. Pharmcol. and Exp. Therap., vol 96, 99–113, 1949) and was found to be 200 mg./kg.

It was found that 2.5 mg./kg. of the products of this invention injected intravenously into cats caused a marked rise in blood pressure. Because of the extremely high therapeutic ratio of the compounds of this invention it is believed that they will be useful in the treatment of surgical shock and the maintenance of blood pressure during spinal anaesthesia.

The invention is illustrated but not limited by the following example:

Example I

A solution of 21.3 grams of α-methallyl-α-phenylacetonitrile was added dropwise during 20 min. to a slurry of 7.0 grams of lithium aluminum hydride in 200 ml. anhydrous ethyl ether accompanied by vigorous stirring. The temperature of the reaction mixture was maintained at 29–32° C. The mixture was refluxed for one and one half hours. The complex was decomposed by the cautious addition of water, the solids were collected, and washed repeatedly with more ethyl ether. The combined ethereal extracts were washed with water and evaporated to dryness to afford a yellow oil. This oil was dissolved in 50 ml. of 6 N hydrochloric acid and extracted three times with 100 ml. portions of ethyl ether to remove any unchanged nitrile. The aqueous acid solution was made basic by the addition of 15 grams of sodium hydroxide dissolved in 25 ml. of water and extracted four times with 100 ml. each of ethyl ether. The ethereal solution was washed with water and evaporated to give 19.7 grams (90% of theory) of crude β-methallyl-β-phenethylamine, $N_D^{25}$ 1.5273 depicted as follows:

The analytical sample of β-methallyl-β-phenethylamine was prepared by distilling the free amine on a spinning band column, B.P. 61° C./0.18 mm., $N_D^{25}$ 1.5250.

Analysis.—Calculated for $C_{12}H_{16}N$: C, 82.23%; H, 9.78%; N, 7.99%. Found: C, 82.30%; H, 9.90%; N, 8.21%.

β-methallyl-β-phenethylamine hydrochloride was prepared by dissolving the free amine in a slight excess of 6 N hydrochloric acid evaporating the solution to dryness, and recrystallizing the salt from methanol and ethyl ether. β-methallyl-β-phenethyl amine hydrochloride may also be prepared by passing dry hydrogen chloride into an anhydrous ethyl ether solution of the free amine, the precipitated hydrochloride washed with anhydrous ethyl ether, and then recrystallized from methanol and ethyl ether.

The analytical sample of β-methallyl-β-phenethylamine hydrochloride melted at 244–244.5° C.

Analysis.—Calculated for $C_{12}H_{16}N·HCl$: N, 6.62%. Found: N, 6.32%.

The starting material used in this example was prepared as follows:

Phenylacetonitrile was added portionwise to a sodium ethoxide solution, the solution was evaporated to dryness, toluene added, and the mixture evaporated to dryness in vacuo to remove the remaining ethanol. The solid sodiophenylacetonitrile suspended in toluene was treated below room temperature with methallyl chloride. The mixture was refluxed 40 hrs., cooled, washed with water, and the solvent was removed. The residual oil was distilled to give a 60% yield of α-methallyl-α-phenylacetonitrile, B.P. 67–78° C./0.18–0.20 mm., $N_D^{25}$ 1.5185.

It will be appreciated by those skilled in the art that the chemical structure of the compounds of this invention contain asymmetrical carbon atoms, and are therefore capable of existing in optically active forms. Because of the difficulty of representing the structural differences in graphic formula, the general formula has been used in the example without distinction as to the particular structural and optical configurations of the compounds. However, it should be expressly understood that while no notation has been used to mark the distinction referred to above, the formula used is to be interpreted in the generic sense. Such a formula does not merely represent the unresolved mixture of isomers.

We claim:
1. A compound selected from the group consisting of β-methallyl-β-phenethylamine, and the non-toxic acid addition salts thereof.
2. β-methallyl-β-phenethylamine.
3. The hydrochloride salt of β-methallyl-β-phenethylamine.

No references cited.